United States Patent
Chan et al.

(10) Patent No.: US 8,306,519 B2
(45) Date of Patent: Nov. 6, 2012

(54) OPTIMIZING LONG TERM EVOLUTION (LTE) CAPACITY USING AN ADAPTIVE DORMANCY TIMER

(75) Inventors: Yee Sin Chan, San Jose, CA (US); Jin Yang, Orinda, CA (US); Lalit R. Kotecha, San Ramon, CA (US); Matthew W. Nelson, Pleasanton, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 172 days.

(21) Appl. No.: 12/950,441

(22) Filed: Nov. 19, 2010

(65) Prior Publication Data
US 2012/0129509 A1 May 24, 2012

(51) Int. Cl.
*H04M 3/00* (2006.01)
(52) U.S. Cl. .......... 455/418; 455/574; 455/450
(58) Field of Classification Search .......... None
See application file for complete search history.

(56) References Cited

U.S. PATENT DOCUMENTS

| | | | |
|---|---|---|---|
| 8,155,655 B1 * | 4/2012 | Vargantwar et al. | 455/450 |
| 2007/0259673 A1 * | 11/2007 | Willars et al. | 455/453 |
| 2008/0039032 A1 * | 2/2008 | Haumont | 455/115.1 |
| 2011/0319064 A1 * | 12/2011 | Lenart et al. | 455/418 |

* cited by examiner

*Primary Examiner* — Rafael Pérez-Gutiérrez
*Assistant Examiner* — German Viana Di Prisco

(57) ABSTRACT

A device classifies access or control channel signals into a first class or a second class, initializes a dormancy timer associated with the device, and sets the dormancy timer to a default value. The device also sets a signal target utilization threshold, receives actual signals via the access or control channel, and identifies, when a number of the actual signals exceeds the signal target utilization threshold, a particular signal, from the actual signals, as belonging to the first class or the second class. The device further increases the default value of the dormancy timer when the particular signal belongs to the first class, and decreases the default value of the dormancy timer when the particular signal belongs to the second class.

20 Claims, 10 Drawing Sheets

OPTIMIZING LONG TERM EVOLUTION (LTE) CAPACITY USING AN ADAPTIVE DORMANCY TIMER

BACKGROUND

Long Term Evolution (LTE) is a Third Generation Partnership Project (3GPP) standard for mobile network technology. The LTE describes requirements for mobile communications systems in evolved or advanced cellular broadband technologies. Such requirements include Evolved Universal Mobile Telecommunications System (UMTS) Terrestrial Radio Access Network (E-UTRAN) which is a high-speed radio access technique to meet increased network demands, including improving user throughputs and network capacity, reducing latency, and increasing mobility.

The LTE includes protocols, such as a Radio Resource Control (RRC) protocol, which is responsible for the assignment, configuration, and release of radio resources between a user device (e.g., a mobile telephone, a smartphone, etc.) and a base station or other access or LTE equipment. According to the RRC protocol, the two basic RRC modes for the user device (also referred to as a user equipment) are a "connected mode" and an "idle mode." During the connected mode or state, the user device may exchange signals with a network and may perform other related operations. During the idle mode or state, the user device may shut down at least some of its connected mode operations.

In mobile communications, applications can generally be classified as data channel intensive traffic or access/control channel intensive traffic. Data channel intensive traffic includes video streaming, video-telephony, and transferring of large files. In contrast, access/control channel intensive traffic (also referred to as "thin traffic") does not require large data channel usage. Examples of access/control channel intensive traffic include instant messaging (IM), online chat, and real-time online discussion forums. For such thin traffic connections, the most likely radio frequency (RF) bottlenecks, depending on configuration, are the setup or release of a RRC connection for each time messages need to be exchanged between user devices, or control channel overhead associated with maintaining RRC connections.

DETAILED DESCRIPTION OF PREFERRED EMBODIMENTS

The following detailed description refers to the accompanying drawings. The same reference numbers in different drawings may identify the same or similar elements.

Systems and/or methods described herein may adaptively and dynamically optimize a setting of a dormancy timer to improve a capacity of a LTE system. The dormancy timer may be provided in a user device and/or a base station, and may be used to time a dormant (or inactive) state of the user device. In one example implementation, the systems and/or methods may classify access and/or control channel signals into a first class and a second class, and may initialize a dormancy timer. The systems and/or methods may set the dormancy timer to a default value, and may set a signal target utilization threshold. The systems and/or methods may receive signals via the access/control channel, and may identify a particular signal as a first class signal or a second class signal when the signal target utilization threshold is met. If the particular signal is classified in the first class, the value of the dormancy timer may be increased. If the particular signal is classified in the second class, the value of the dormancy timer may be decreased.

As used herein, the term "user" is intended to be broadly interpreted to include a user device or a user of a user device.

Figure 1:
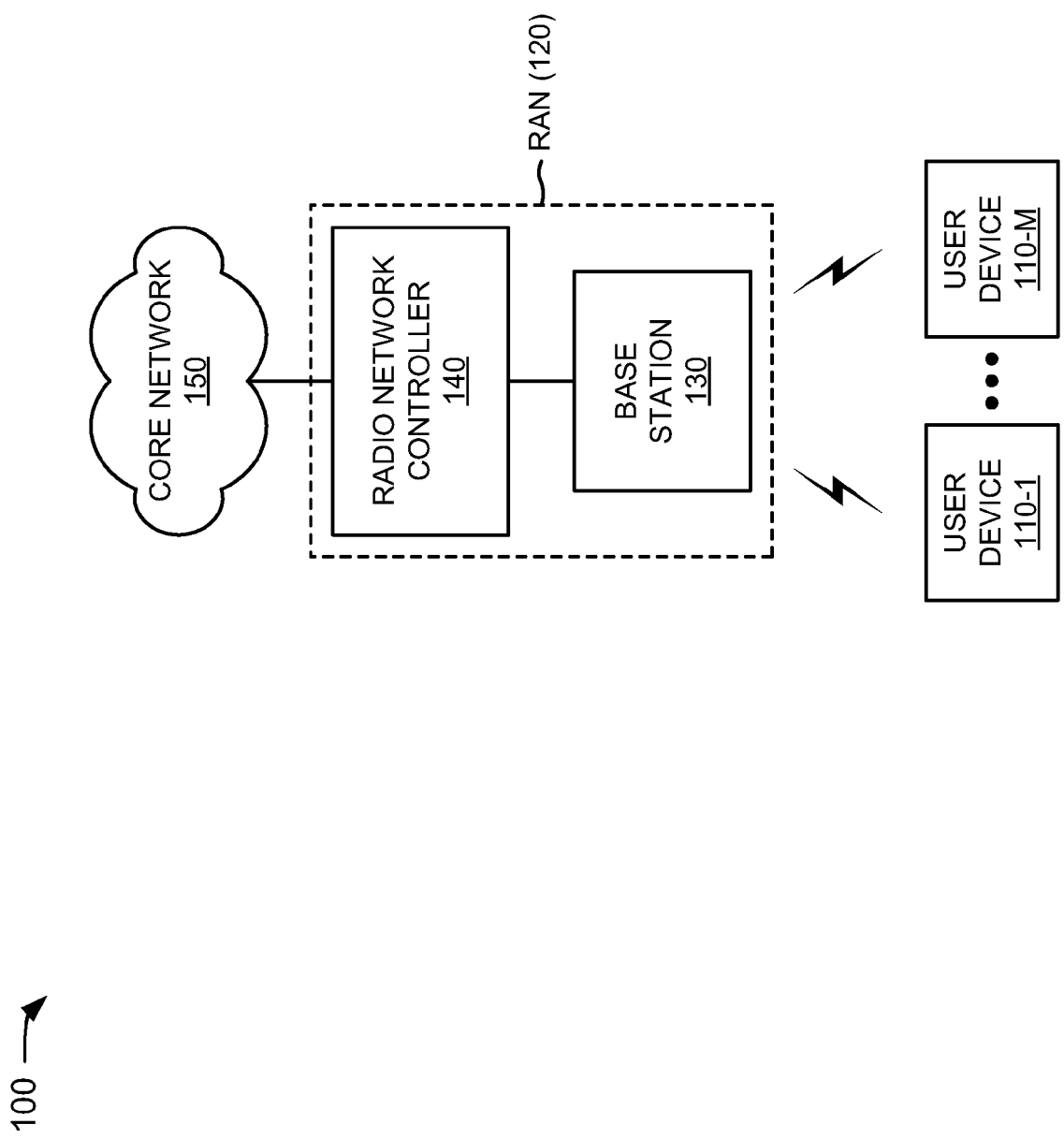
FIG. 1 is a diagram of an example network in which systems and/or methods described herein may be implemented.

FIG. 1 depicts a diagram of an example network 100 in which systems and/or methods described herein may be implemented. As shown, network 100 may include a group of user devices 110-1 through 110-M (referred to collectively as "user devices 110", and in some instances individually, as "user device 110"); a radio access network (RAN) 120 that includes a base station 130 and a radio network controller 140; and a core network 150. Two user devices 110, one radio access network 120, one base station 130, one radio network controller 140, and one core network 150 have been illustrated in FIG. 1 for simplicity. In practice, there may be more user devices 110, radio access networks 120, base stations 130, radio network controllers 140, and/or core networks 150. Also, in some instances, a component of network 100 may perform one or more functions described as being performed by another component or group of components of network 100.

User device 110 may include one or more devices capable of sending/receiving voice and/or data to/from radio access network 120. User device 110 may include, for example, a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a wireless device, a smartphone, a laptop computer (e.g., with a wireless air card), a global positioning system (GPS) device, a content recording device (e.g., a camera, a video camera, etc.), etc. In another example, user device 110 may include a fixed (e.g., provided in a particular location, such as within a user's home) computation and/or communication device, such as a laptop computer, a personal computer, a tablet computer, a set-top box (STB), a television, a gaming system, etc.

Radio access network 120 may include one or more devices for transmitting voice and/or data to user devices 110 and core network 150. In one example implementation, radio access network 120 may include a group of base stations 130 and a group of radio network controllers 140. In some instances, a component of radio access network 120 (e.g., base station 130 and radio network controller 130) may perform one or more functions described as being performed by another component or group of components in radio access network 120.

In one example, radio access network 120 may provide a wireless access network for user devices 110. The wireless access network, in one implementation, may correspond to a LTE network. In another implementation, the wireless access network may include a WiFi network or other access networks (e.g., an enhanced high-rate packet data (eHRPD) network or a WiMax network). In still another implementation, the wireless access network may include a radio access network capable of supporting high data rate, low latency, packet optimization, large capacity and coverage, etc.

Base station 130 (also referred to as "Node Bs") may include one or more devices that receive voice and/or data from radio network controller 140 and transmit that voice and/or data to user device 110 via an air interface. Base station 130 may also include one or more devices that receive voice and/or data from user device 110 over an air interface and transmit that voice and/or data to radio network controller 140 or other user devices 110.

In one example implementation, base station 130 may classify access and/or control channel signals into a first class and a second class, and may initialize a dormancy timer. Base station 130 may set the dormancy timer to a default value, and may set a signal target utilization threshold (e.g., a configurable threshold for a number of control signals). Base station 130 may receive signals via the access/control channel, and may identify a particular signal as a first class signal or a second class signal when the signal target utilization threshold is met. If the particular signal is classified in the first class, base station 130 may increase the value of the dormancy timer. If the particular signal is classified in the second class, base station 130 may decrease the value of the dormancy timer.

Radio network controller 140 may include one or more devices that control and manage base station 130. Radio network controller 140 may also include devices that perform data processing to manage utilization of radio network services. Radio network controller 140 may transmit/receive voice and data to/from base station 130, other radio network controller 140, and/or core network 150. Radio network controller 140 may act as a controlling radio network controller (CRNC), a drift radio network controller (DRNC), or a serving radio network controller (SRNC). A CRNC may be responsible for controlling the resources of a base station 130. On the other hand, a SRNC may serve a particular user device 110 and may manage connections towards that user device 110. Likewise, a DRNC may fulfill a similar role to the SRNC (e.g., may route traffic between a SRNC and a particular user device 110).

Core network 150 may include one or more devices that transfer/receive voice and/or data to a circuit-switched and/or packet-switched network. In one example implementation, core network 150 may include a Mobile Switching Center (MSC), a Gateway MSC (GMSC), a Media Gateway (MGW), a Serving General Packet Radio Service (GPRS) Support Node (SGSN), a Gateway GPRS Support Node (GGSN), and/or other devices.

Although FIG. 1 shows example components of network 100, in other implementations, network 100 may contain fewer components, different components, differently arranged components, or additional components than depicted in FIG. 1.

Figure 2:
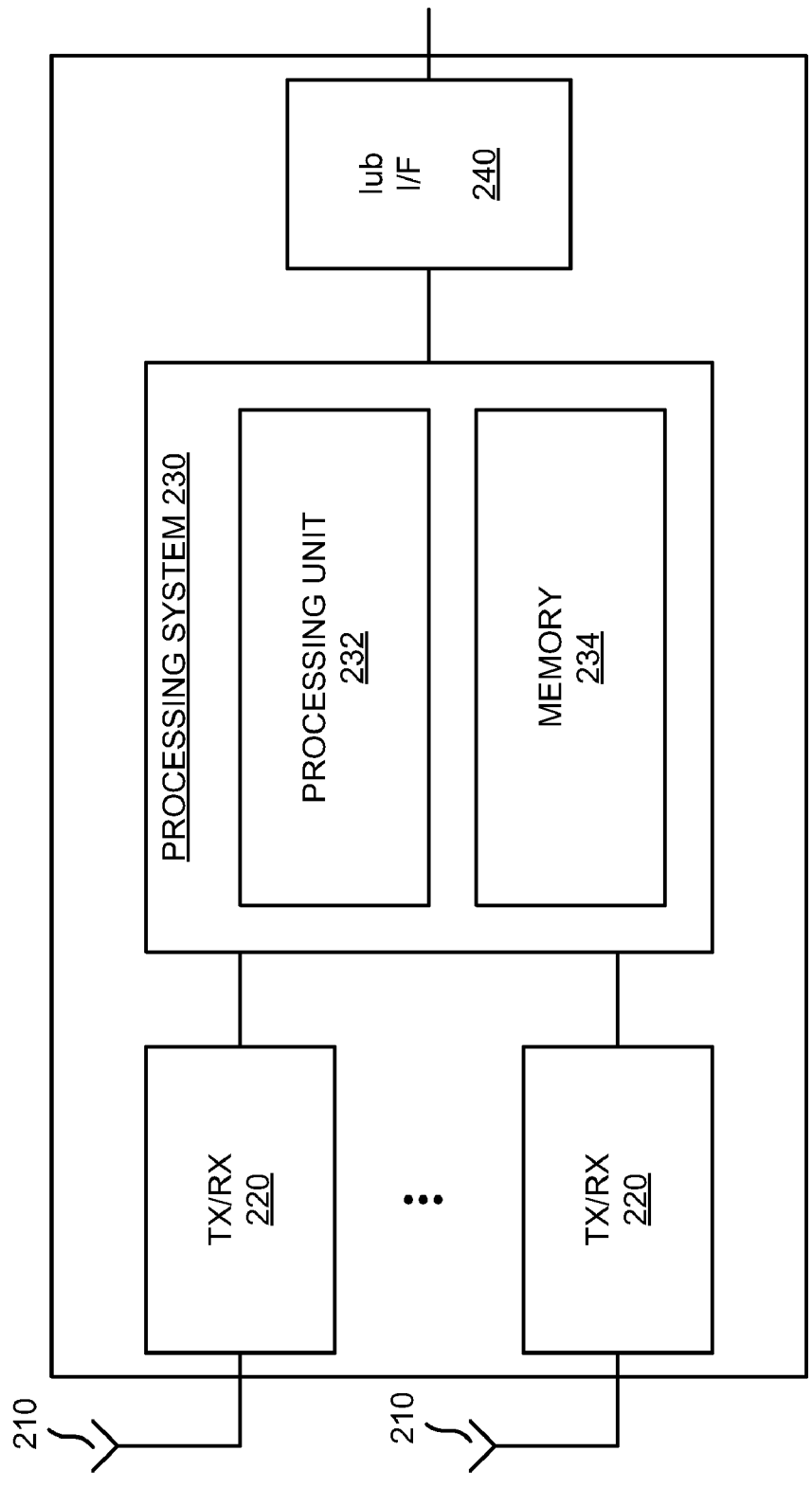
FIG. 2 is a diagram of example components of a base station of the network depicted in FIG. 1.

FIG. 2 is a diagram of example components of base station 130. As shown in FIG. 2, base station 130 may include antennas 210, transceivers (TX/RX) 220, a processing system 230, and an Iub interface (I/F) 240.

Antennas 210 may include one or more directional and/or omni-directional antennas. Transceivers 220 may be associated with antennas 210 and may include transceiver circuitry for transmitting and/or receiving symbol sequences in a network, such as network 100, via antennas 210.

Processing system 230 may control the operation of base station 130. Processing system 230 may also process information received via transceivers 220 and Iub interface 240. Processing system 230 may further measure quality and strength of a connection, may determine a frame error rate (FER), and may transmit this information to radio network controller 140. As illustrated, processing system 230 may include a processing unit 232 and a memory 234.

Processing unit 232 may include one or more processors, microprocessors, application specific integrated circuits (ASICs), field programmable gate arrays (FPGAs), or the like. Processing unit 232 may process information received via transceivers 220 and Iub interface 240. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 232 may transmit control messages and/or data messages, and may cause those control messages and/or data messages to be transmitted via transceivers 220 and/or Iub interface 240. Processing unit 232 may also process control messages and/or data messages received from transceivers 220 and/or Iub interface 240.

Memory 234 may include a random access memory (RAM), a read-only memory (ROM), and/or another type of memory to store data and instructions that may be used by processing unit 232.

Iub interface 240 may include one or more line cards that allow base station 130 to transmit data to and receive data from radio network controller 140.

As described herein, base station 130 may perform certain operations in response to processing unit 232 executing software instructions contained in a computer-readable medium, such as memory 234. A computer-readable medium may be defined as a non-transitory memory device. A memory device may include space within a single physical memory device or spread across multiple physical memory devices. The software instructions may be read into memory 234 from another computer-readable medium or from another device via antennas 210 and transceivers 220. The software instructions contained in memory 234 may cause processing unit 232 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows example components of base station 130, in other implementations, base station 130 may contain fewer components, different components, differently arranged components, or additional components than depicted in FIG. 2. In still other implementations, one or more components of base station 130 may perform one or more other tasks described as being performed by one or more other components of base station 130.

Figure 3:
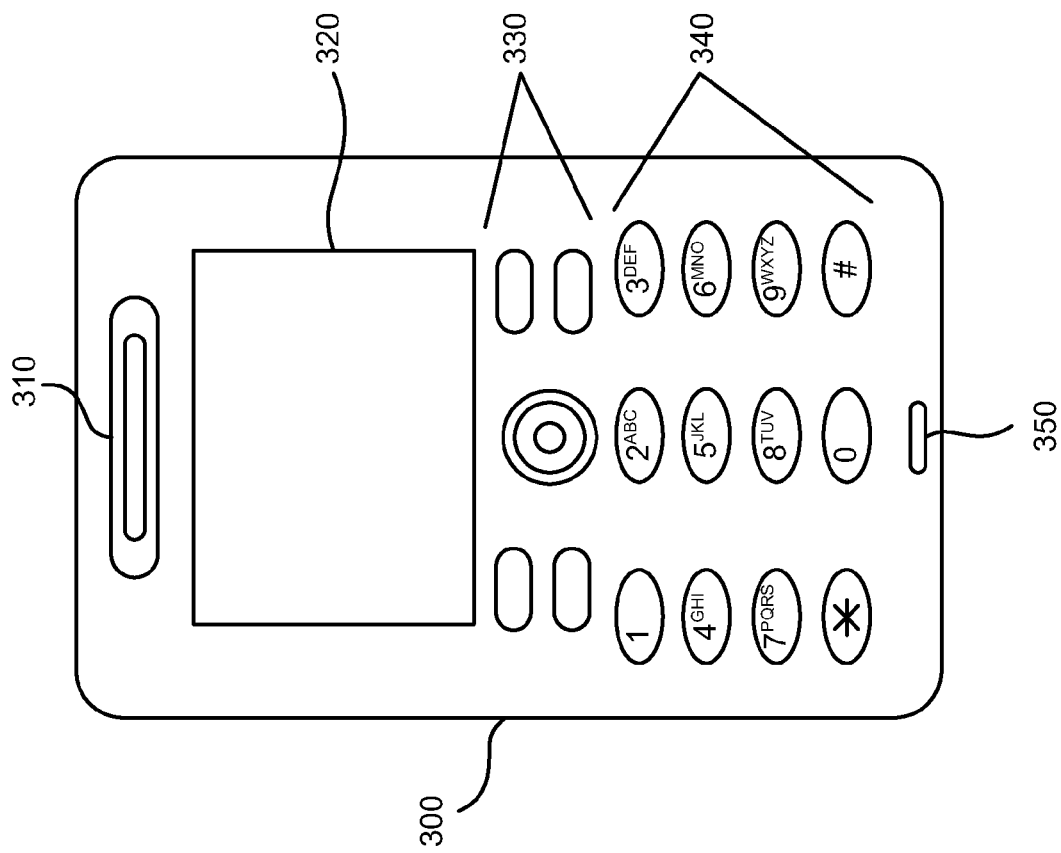
FIG. 3 is a diagram of an example user device of the network illustrated in FIG. 1.

FIG. 3 is a diagram of an example user device 110 (e.g., a mobile communication device). As illustrated, user device 110 may include a housing 300, a speaker 310, a display 320, control buttons 330, a keypad 340, and a microphone 350. Housing 300 may protect the components of user device 110 from outside elements. Speaker 310 may provide audible information to a user of user device 110.

Display 320 may provide visual information to the user. For example, display 320 may display text input into user device 110; text, images, video, and/or graphics received from another device; and/or information regarding incoming or outgoing calls or text messages, emails, media, games, phone books, address books, the current time, etc. In one example implementation, display 320 may include a touch screen display that may be configured to receive a user input when the user touches display 320. For example, the user may provide an input to display 320 directly, such as via the user's finger, or via other input objects, such as a stylus. User inputs received via display 320 may be processed by components and/or devices operating in user device 110. The touch screen display may permit the user to interact with user device 110 in order to cause user device 110 to perform one or more operations described herein. Example technologies to implement a touch screen on display 320 may include, for example, a near-field-sensitive (e.g., capacitive) overlay, an acoustically-sensitive (e.g., surface acoustic wave) overlay, a photo-sensitive (e.g., infrared) overlay, a pressure sensitive (e.g., resistive) overlay, and/or any other type of touch panel overlay that allows display 320 to be used as an input device. The touch-screen-enabled display 320 may also identify movement of a body part or a pointing device as it moves on or near the surface of the touch-screen-enabled display 320.

Control buttons 330 may permit the user to interact with user device 110 to cause user device 110 to perform one or more operations. For example, control buttons 330 may be used to cause user device 110 to transmit information. Keypad 340 may include a standard telephone keypad. In one example implementation, control buttons 330 and/or keypad 340 may be omitted, and the functionality provided by control buttons 330 and/or keypad 340 may be provided by display 320 (e.g., via a touch screen display). Microphone 350 may receive audible information from the user.

Although FIG. 3 shows example components of user device 110, in other implementations, user device 110 may contain fewer components, different components, differently arranged components, or additional components than depicted in FIG. 3. In still other implementations, one or more components of user device 110 may perform one or more other tasks described as being performed by one or more other components of user device 110.

Figure 4:
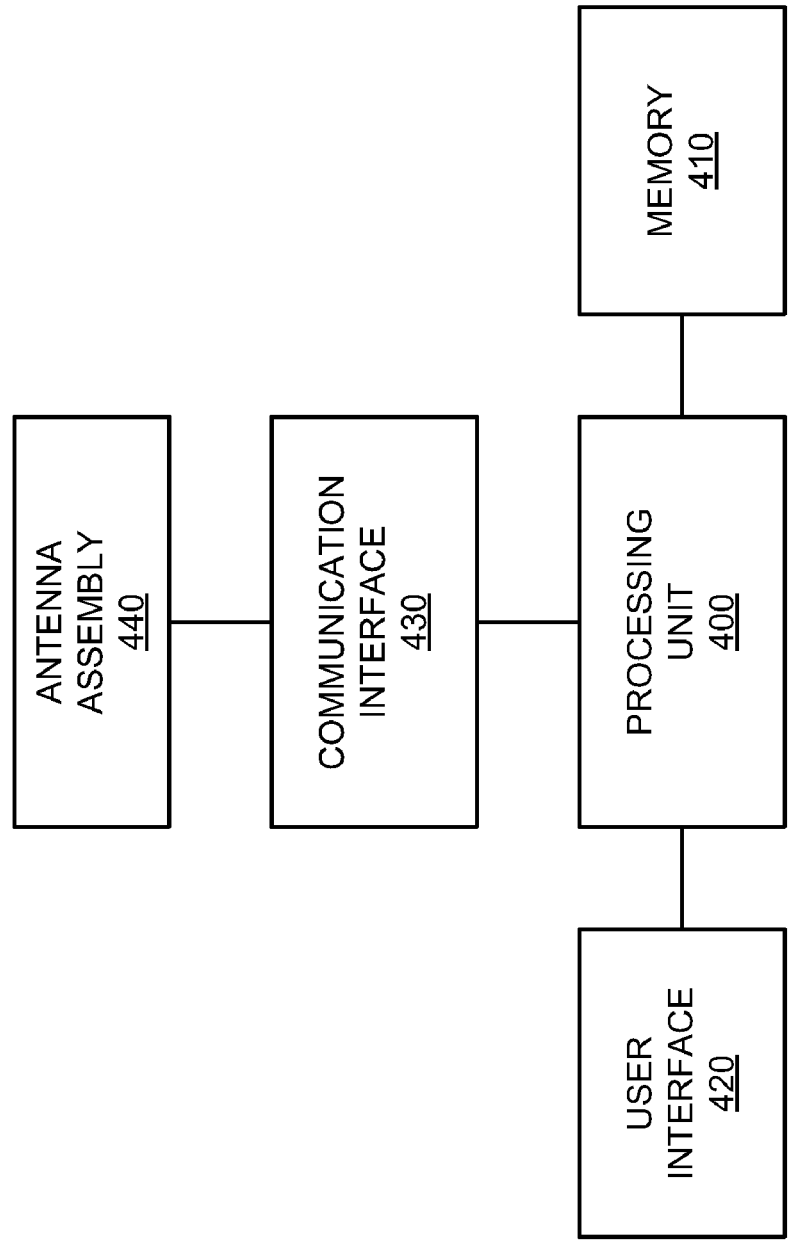
FIG. 4 is a diagram of example components of the user device depicted in FIG. 3.

FIG. 4 is a diagram of example components of user device 110. As shown, user device 110 may include a processing unit 400, memory 410, a user interface 420, a communication interface 430, and an antenna assembly 440. Components of user device 110 may interconnect via wired and/or wireless connections.

Processing unit 400 may include one or more processors, microprocessors, ASICs, FPGAs, or the like. Processing unit 400 may control operation of user device 110 and its components in a manner described herein.

Memory 410 may include a RAM, a ROM, and/or another type of memory to store data and instructions that may be used by processing unit 400.

User interface 420 may include mechanisms for inputting information to user device 110 and/or for outputting information from user device 110. Examples of input and output mechanisms might include buttons (e.g., control buttons 330, keys of keypad 340, a joystick, etc.) or a touch screen interface to permit data and control commands to be input into user device 110; a speaker (e.g., speaker 310) to receive electrical signals and output audio signals; a microphone (e.g., microphone 350) to receive audio signals and output electrical signals; a display (e.g., display 320) to output visual information (e.g., text input into user device 110); and/or a vibrator to cause user device 110 to vibrate.

Communication interface 430 may include, for example, a transmitter that may convert baseband signals from processing unit 400 to radio frequency (RF) signals and/or a receiver that may convert RF signals to baseband signals. Alternatively, communication interface 430 may include a transceiver to perform functions of both a transmitter and a receiver. Communication interface 430 may connect to antenna assembly 440 for transmission and/or reception of the RF signals.

Antenna assembly 440 may include one or more antennas to transmit and/or receive RF signals over the air. Antenna assembly 440 may, for example, receive RF signals from communication interface 430 and transmit them over the air, and receive RF signals over the air and provide them to communication interface 430. In one implementation, for example, communication interface 430 may communicate with a network and/or devices connected to a network.

As described herein, user device 110 may perform certain operations described herein in response to processing unit 400 executing software instructions of an application contained in a computer-readable medium, such as memory 410. The software instructions may be read into memory 410 from another computer-readable medium or from another device via communication interface 430. The software instructions contained in memory 410 may cause processing unit 400 to perform processes that will be described later. Alternatively, hardwired circuitry may be used in place of or in combination with software instructions to implement processes described herein. Thus, implementations described herein are not limited to any specific combination of hardware circuitry and software.

Although FIG. 4 shows example components of user device 110, in other implementations, user device 110 may contain fewer components, different components, differently arranged components, or additional components than depicted in FIG. 4. In still other implementations, one or more components of user device 110 may perform one or more other tasks described as being performed by one or more other components of user device 110.

Figure 5:
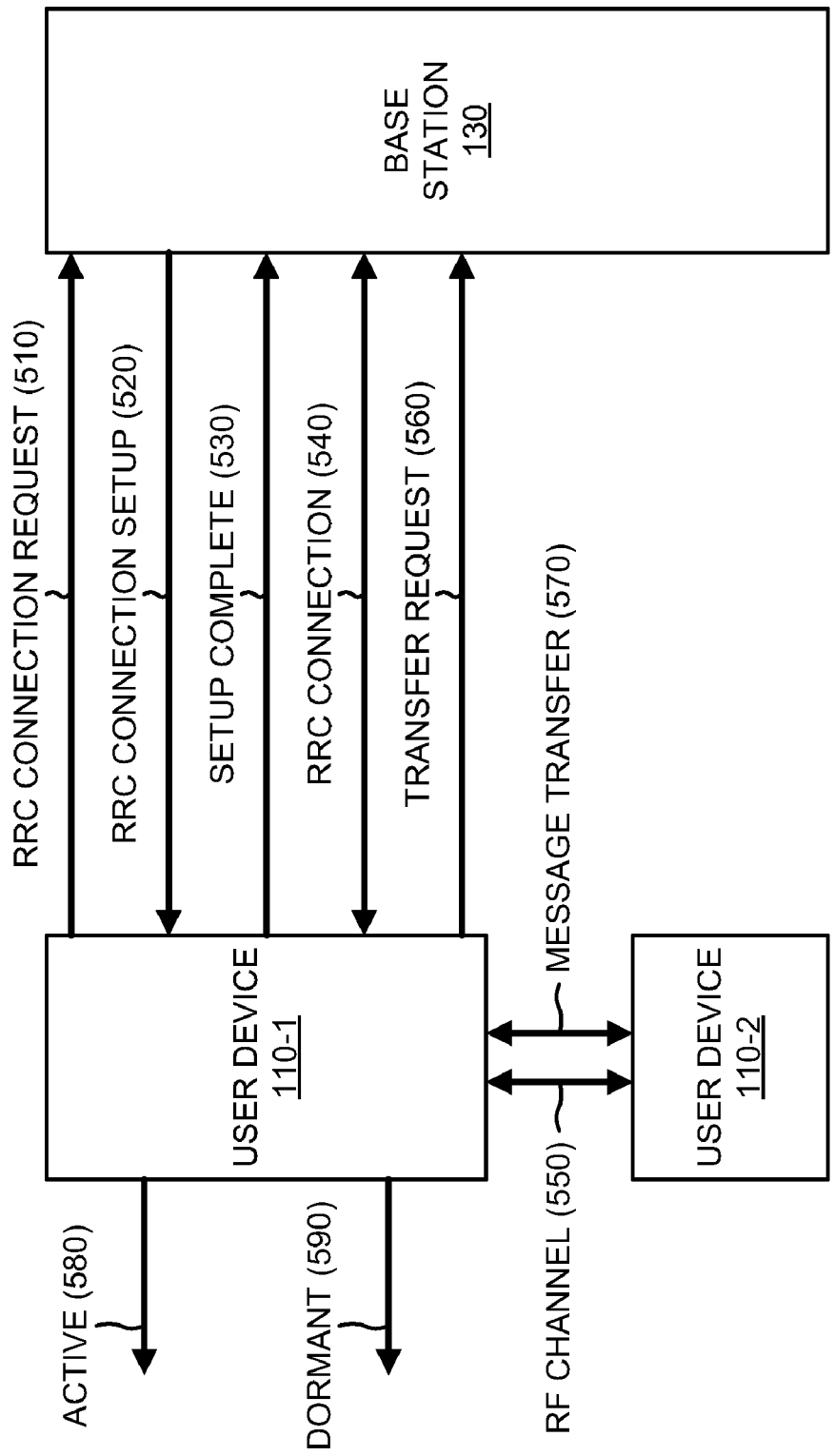
FIG. 5 is a diagram of example operations capable of being performed by an example portion of the network illustrated in FIG. 1.

FIG. 5 is a diagram of example operations capable of being performed by an example portion 500 of network 100. As shown, example network portion 500 may include user devices 110-1 and 110-2 and base station 130. User devices 110-1 and base station 130 may include the features described above in connection with, for example, one or more of FIGS. 1-4.

In one example, a user of user device 110-1 may wish to establish a connection with user device 110-2 in order to exchange instant messages (e.g., access/control channel intensive traffic) with user device 110-2. As further shown in FIG. 5, user device 110-1 may generate a RRC connection request 510, and may provide RRC connection request 510 to base station 130. RRC connection request 510 may include a RRC establishment cause and an initial terminal identifier (e.g., of user device 110-1). The initial terminal identifier may be an identifier that is unique to user device 110-1 and may permit identification of user device 110-1 despite its location. In one example, user device 110-1 may provide RRC connection request 510 to base station 130 on a common control channel (CCCH). Upon transmitting RRC connection request 510, user device 110-1 may trigger an internal timer and may wait for a RRC connection setup message 520 on the common control channel.

Base station 130 may receive RRC connection request 510, may determine that user device 110-1 may establish a network connection, and may transmit RRC connection setup message 520 to user device 110-1 (e.g., on the common control channel). RRC connection setup message 520 may include a radio network identifier (e.g., to permit base station 130 to identify connected state user devices 110), radio bearer setup information, and the initial terminal identifier. User device 110-1 may receive RRC connection setup message 520, and may generate a RRC connection setup complete message 530. User device 110-1 may provide RRC connection setup complete message 530 to base station 130, and a RRC connection 540 may be established between user device 110-1 and base station 530 (e.g., based on RRC connection setup complete message 530).

When RRC connection 540 is established, base station 130 may dedicate or reserve a certain amount of RF resources until RRC connection 540 is released. For example, when RRC connection 540 is established, a RF channel 550 may be created between user device 110-1 and user device 110-2 (e.g., to permit exchange of instant messages between user devices 110-1 and 110-2). A length of a reservation of RRC connection 540 may be controlled by a configurable dormancy timer (e.g., provided in user device 110-2 and/or base station 130). The dormancy timer may terminate RRC connection 540 between user device 110-1 and base station 130 when user device 110-1 is dormant (e.g., not exchanging messages with user device 110-2) for a predetermined period of time.

When user device 110-1 wants to exchange messages with user device 110-2 through RF channel 550 or when user device 110-1 receives messages from user device 110-2 through RF channel 550, user device 110-1 may provide a transfer request 560 to base station 130. Transfer request 560 may inform base station 130 that user devices 110-1 and 110-2 are going to exchange messages over RF channel 550. During this time, messages may be transferred between user device 110-1 and user device 110-2, as indicated by reference number 570, RRC connection 540 may be in a RRC connection active state, and user device 110-1 may be in a RRC connected or active mode, as indicated by reference number 580. After completion of message transfer 570, the dormancy timer may be started, RRC connection 540 may be in a RRC dormant state, and user device 110-1 may be in a RRC dormant mode, as indicated by reference number 590.

During the RRC dormant state, if user device 110-1 generates another transfer request 560, RRC connection 540 may reenter the RRC connection active state and the dormancy timer may be reset (e.g., to a default value). If user device 110-1 does not generate another transfer request 560 before the dormancy timer expires, RRC connection 540 may be released and the RF resources (e.g., RF channel 550) may be allocated to other traffic associated with base station 130. Different configurations of the dormancy timer may have different effects on the network resources (e.g., base station 130) and capacity of radio access network 120. For example, if the dormancy timer is set to a larger value (e.g., a longer time period), more control channel overhead is needed for maintaining RRC connections (e.g., RRC connection 540). In another example, if the dormancy timer is set to a smaller value (e.g., a shorter time period), more access/control channel resources are needed for message transfers (e.g., message transfer 570) associated with the setup or release of RRC connections (e.g., RRC connection 540).

Although FIG. 5 shows example components of network portion 500, in other implementations, network portion 500 may contain fewer components, different components, differently arranged components, or additional components than depicted in FIG. 5. In still other implementations, one or more components of network portion 500 may perform one or more other tasks described as being performed by one or more other components of network portion 500.

Figure 6:
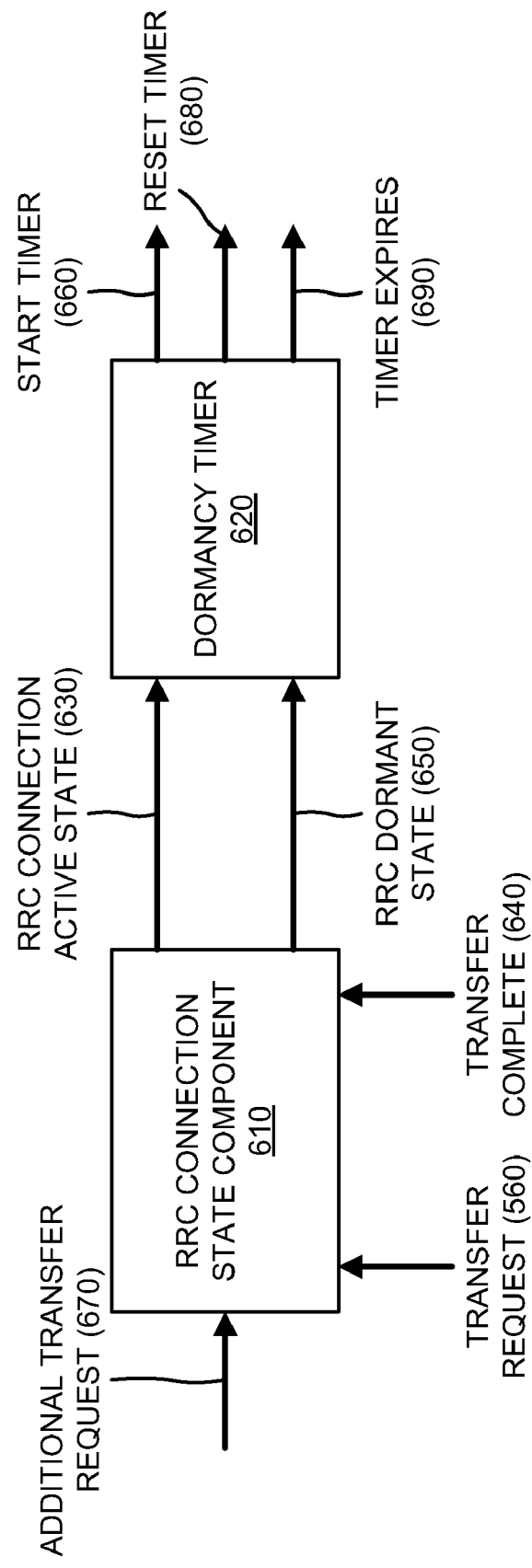
FIG. 6 is a diagram of example functional components of the user device and/or the base station.

FIG. 6 is a diagram of example functional components of a device 600 that may correspond to user device 110 and/or base station 130. In one implementation, the functions described in connection with FIG. 6 may be performed by one or more components of base station 130 (FIG. 2) or one or more components of user device 110 (FIG. 4). As illustrated in FIG. 6, device 600 may include a RRC connection state component 610, and a dormancy timer component 620.

RRC connection state component 610 may include hardware or a combination of hardware and software that may receive transfer request 560 (e.g., from user device 110-1), and may determine a state of a RRC connection (e.g., RRC connection 540) based on transfer request 560. In one example, since transfer request 560 may indicate that messages are going to be exchanged between user devices 110-1 and 110-2, RRC connection state component 610 may determine RRC connection 540 to be in a RRC connection active state 630, and may provide an indication of RRC connection active state 630 to dormancy timer 620. Upon completion of the transfer messages between user devices 110-1 and 110-2, RRC connection state component 610 may receive (e.g., from user device 110-1) an indication 640 that the transfer is complete. Based upon receipt of indication 640, RRC connection state component 610 may determine RRC connection 540 to be in a RRC dormant state 650, and may provide an indication of RRC dormant state 650 to dormancy timer 620.

Dormancy timer 620 may include hardware or a combination of hardware and software that may receive the indication of RRC connection active state 630 from RRC connection state component 610. Upon completion of the transfer messages between user devices 110-1 and 110-2, dormancy timer 620 may receive the indication of RRC dormant state 650 from RRC connection state component 610, and may start the dormancy timer, as indicated by reference number 660. During RRC dormant state 650, if user device 110-1 generates an additional transfer request 670, RRC connection state component 610 may receive additional transfer request 670, and may determine RRC connection 540 to be reentering RRC connection active state 630. Dormancy timer 620 may once again receive the indication of RRC connection active state 630 from RRC connection state component 610, and may reset the dormancy timer (e.g., to a default value), as indicated by reference number 680. However, if user device 110-1 does not generate additional transfer request 670 before the dormancy timer expires, as indicated by reference number 690, RRC connection 540 may be released and the RF resources (e.g., RF channel 550) may be allocated to other traffic.

Although FIG. 6 shows example functional components of device 600, in other implementations, device 600 may contain fewer functional components, different functional components, differently arranged functional components, or additional functional components than depicted in FIG. 6. In still other implementations, one or more functional components of device 600 may perform one or more other tasks described as being performed by one or more other functional components of device 600.

Figure 7:
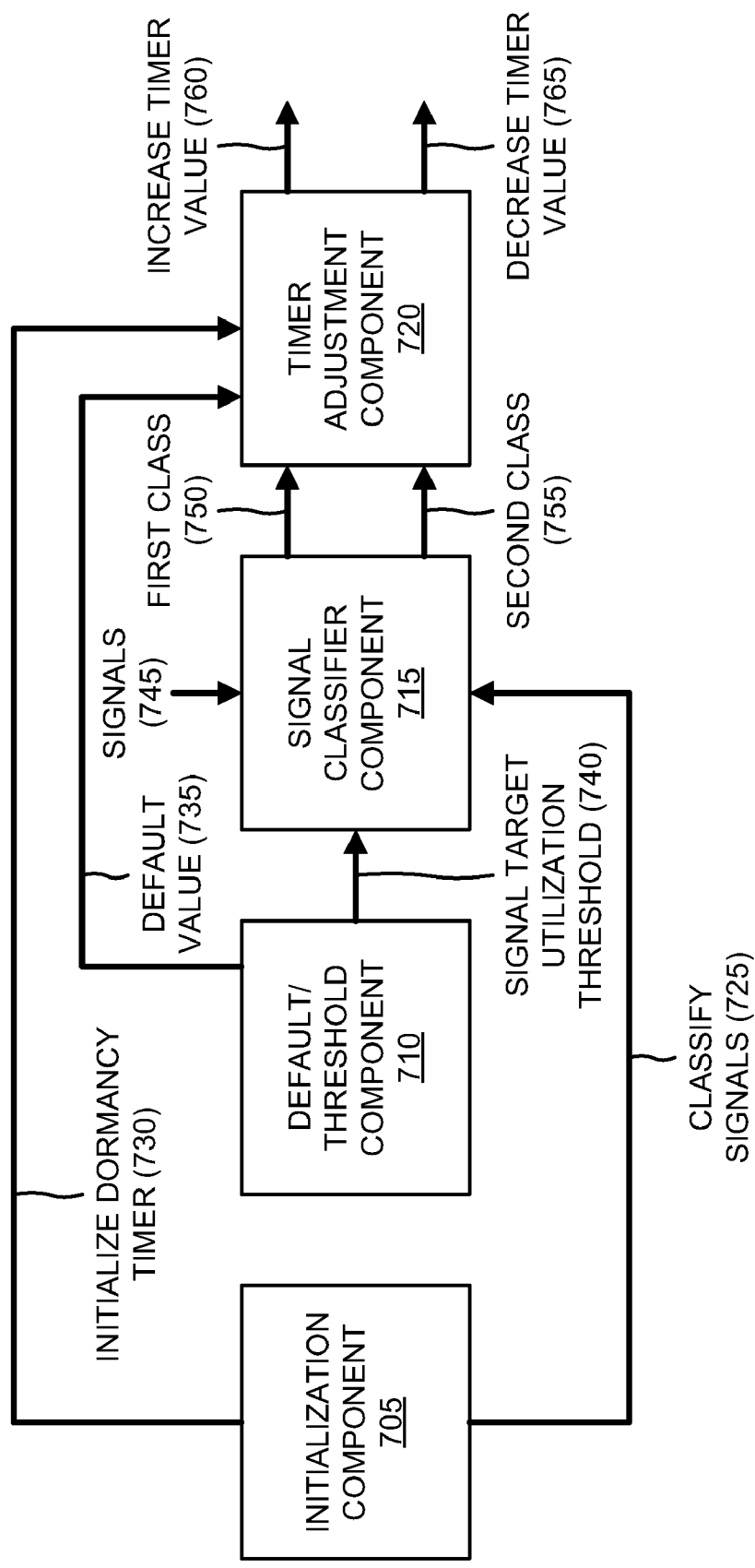
FIG. 7 is a diagram of example functional components of a dormancy timer depicted in FIG. 6.

FIG. 7 is a diagram of example functional components of dormancy timer 620. In one implementation, the functions described in connection with FIG. 7 may be performed by one or more components of base station 130 (FIG. 2) or one or more components of user device 110 (FIG. 4). As illustrated in FIG. 7, dormancy timer 620 may include an initialization component 705, a default/threshold component 710, a signal classifier component 715, and a timer adjustment component 720.

Initialization component 705 may include hardware or a combination of hardware and software that may classify access channel and control channel signals into classes, as indicated by reference number 725. For example, in one implementation, initialization component 705 may classify, into a first class, access/control channel signals that are needed for setup or release of new RRC connections, and may classify, into a second class, access/control channel signals that are needed to maintain RRC connection states. Initialization component 705 may also initialize the dormancy timer, as indicated by reference number 730. In one example implementation, initialization component 705 may initialize the dormancy timer to a default value (e.g., a value preconfigured for user device 110 or base station 130), a value larger than the default value, or a value smaller than the default value. The value larger than the default value may reduce a number of setups or releases of RRC connections. Whereas, the value smaller than the default value may reduce a number of RRC connections. As further shown in FIG. 7, initialization component 705 may provide indication 725 of the signal classification to signal classifier component 715, and may provide indication 730 of the initialized dormancy timer values to timer adjustment component 720.

Default/threshold component 710 may include hardware or a combination of hardware and software that may set the dormancy timer to a default value 735, and may set a signal target utilization threshold 740. Signal target utilization threshold 740 may include a configurable threshold for a number of control signals (e.g., transfer request 560) received by user device 110 or base station 130. As further shown in FIG. 7, default/threshold component 710 may provide default value 735 of the dormancy timer to timer adjustment component 720, and may provide signal target utilization threshold 740 to signal classifier component 715.

Signal classifier component 715 may include hardware or a combination of hardware and software that may receive indication 725 of the signal classification from initialization component 705, and may receive signal target utilization threshold 740 from default/threshold component 710. As further shown in FIG. 7, signal classifier component 715 may receive signals 745 (e.g., transfer requests 560 from user device 110-1), and may determine if a number of received signals 745 exceeds signal target utilization threshold 740. When the number of received signals 745 exceeds signal target utilization threshold 740, signal classifier component 715 may classify (e.g., based on indication 725 of the signal classification) a next received signal 745 as belonging to a first class 750 or to a second class 755. Signal classifier component 715 may classify the next received signal 745 in first class 750 when the next received signal 745 is a signal needed for setup or release of a new RRC connection. Signal classifier component 715 may classify the next received signal 745 in second class 755 when the next received signal 745 is a signal needed to maintain a RRC connection state. As further shown in FIG. 7, signal classifier component 715 may provide first class 750 indication or second class 755 indication to timer adjustment component 720.

Timer adjustment component 720 may include hardware or a combination of hardware and software that may receive indication 730 of the initialized dormancy timer values from initialization component 705, and may receive default value 735 of the dormancy timer from default/threshold component 710. Timer adjustment component 720 may also receive either first class 750 indication or second class 755 indication from signal classifier component 715. If first class 750 indication is received, timer adjustment component 720 may increase default value 735 of the dormancy timer to a value larger than default value 735 (e.g., provided by indication 730 of the initialized dormancy timer values), as indicated by reference number 760. As described above, increasing default value 735 of the dormancy timer may reduce a number of setups or releases of RRC connections. If second class 755 indication is received, timer adjustment component 720 may decrease default value 735 of the dormancy timer to a value smaller than default value 735 (e.g., provided by indication 730 of the initialized dormancy timer values), as indicated by reference number 765. As described above, decreasing default value 735 of the dormancy timer may reduce a number of RRC connections.

Although FIG. 7 shows example functional components of dormancy timer 620, in other implementations, dormancy timer 620 may contain fewer functional components, different functional components, differently arranged functional components, or additional functional components than depicted in FIG. 7. In still other implementations, one or more functional components of dormancy timer 620 may perform one or more other tasks described as being performed by one or more other functional components of dormancy timer 620.

Figure 8:
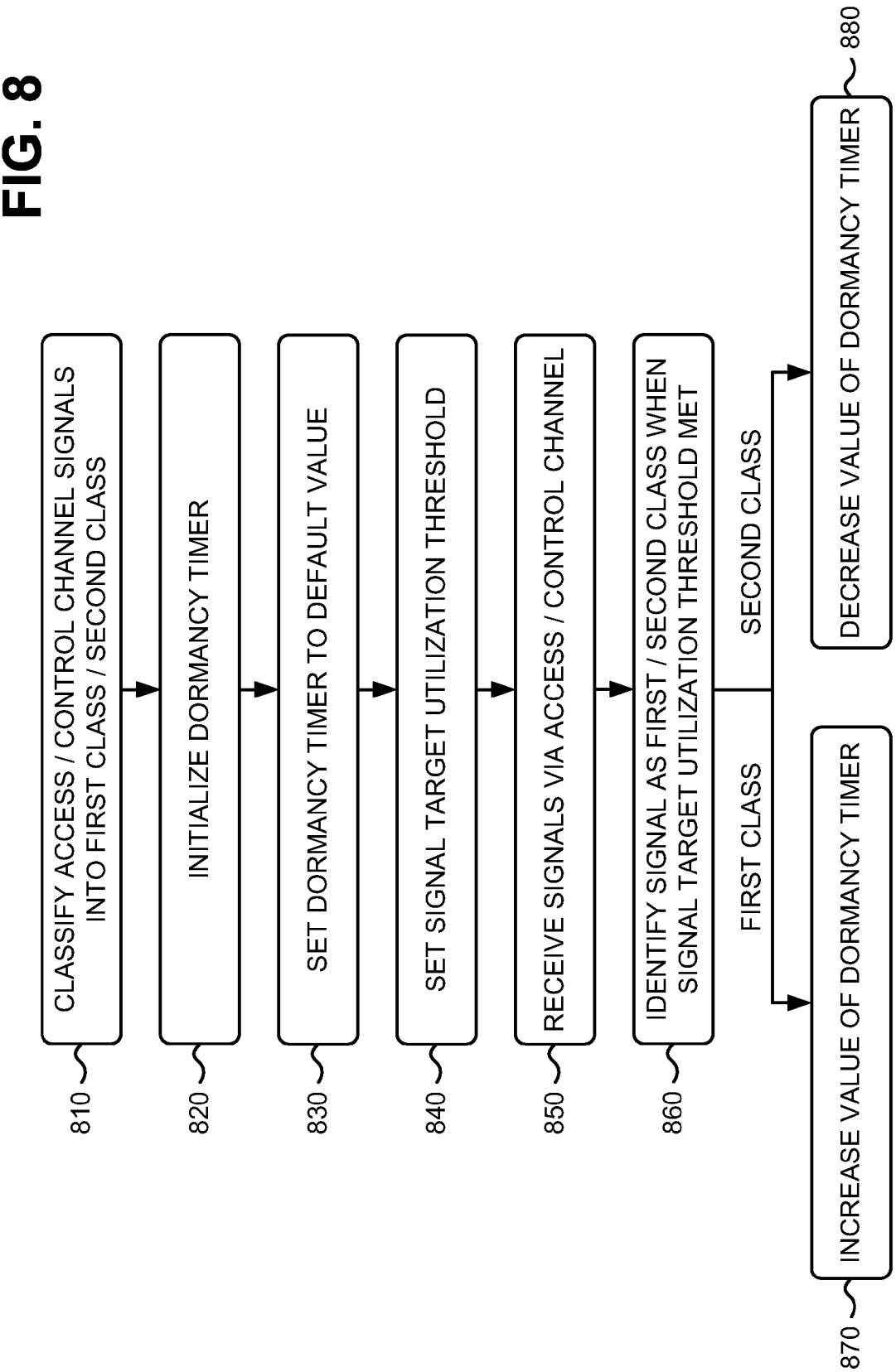
FIGS. 8-10 are flow charts of an example process for optimizing LTE capacity using an adaptive dormancy timer according to implementations described herein.
Figure 9:
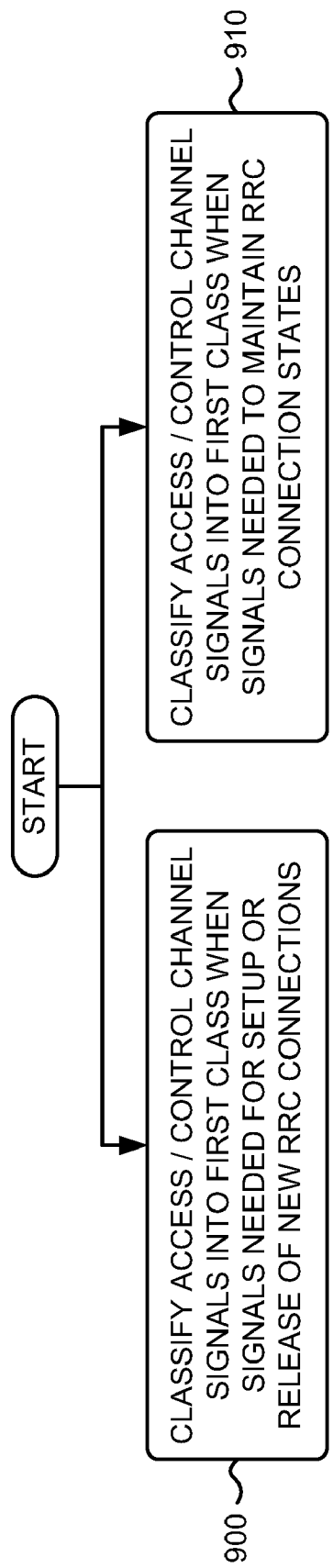
Figure 10:
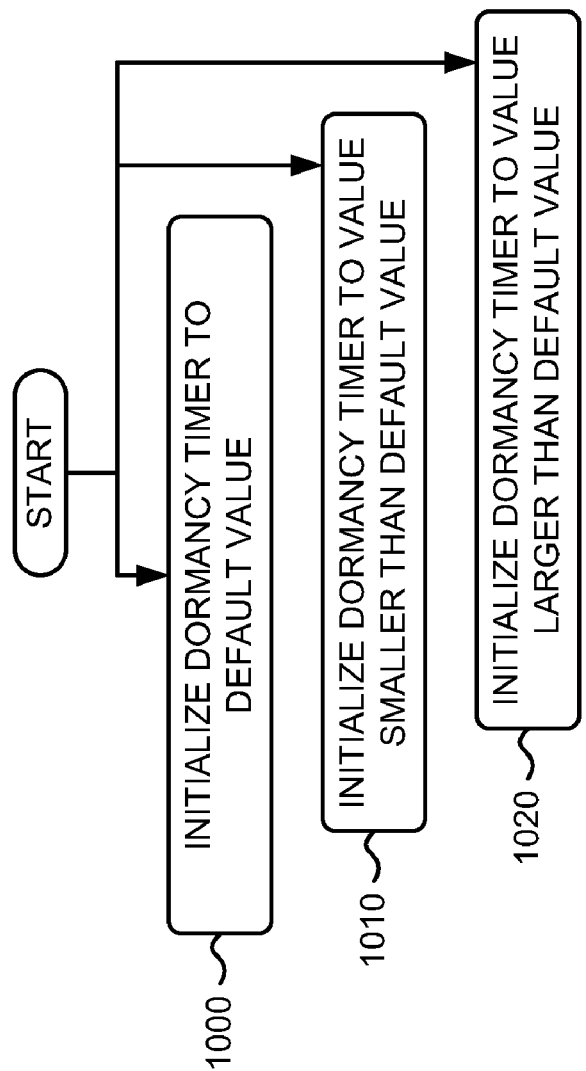

FIGS. 8-10 are flow charts of an example process 800 for optimizing LTE capacity using an adaptive dormancy timer according to implementations described herein. In one implementation, process 800 may be performed by base station 130. In another implementation, some or all of process 800 may be performed by another device or group of devices (e.g., user device 110), including or excluding base station 130.

As shown in FIG. 8, process 800 may include classifying access/control channel signals into a first class or a second class (block 810), and initializing a dormancy timer (block 820). For example, in implementations described above in connection with FIG. 7, initialization component 705 of device 600 may classify access channel and control channel signals into classes, as indicated by reference number 725. In one example, initialization component 705 access/control channel signals into a first class or a second class. Initialization component 705 may also initialize the dormancy timer, as indicated by reference number 730.

As further shown in FIG. 8, process 800 may include setting the dormancy timer to a default value (block 830), and setting a signal target utilization threshold (block 840). For example, in implementations described above in connection with FIG. 7, default/threshold component 710 of device 600 may set the dormancy timer to default value 735, and may set signal target utilization threshold 740. Signal target utilization threshold 740 may include a configurable threshold for a number of control signals (e.g., transfer request 560) received by user device 110 or base station 130.

Returning to FIG. 8, process 800 may include receiving signals via an access/control channel (block 850), and identifying a particular signal as first class or second class when the signal target utilization threshold is met by the received signals (block 860). For example, in implementations described above in connection with FIG. 7, signal classifier component 715 of device 600 may receive signals 745 (e.g., transfer requests 560 from user device 110-1), and may determine if a number of received signals 745 exceeds signal target utilization threshold 740. When the number of received signals 745 exceeds signal target utilization threshold 740, signal classifier component 715 may classify (e.g., based on indication 725 of the signal classification) a next received signal 745 as belonging to first class 750 or to second class 755. Signal classifier component 715 may classify the next received signal 745 in first class 750 when the next received signal 745 is a signal needed for setup or release of a new RRC connection. Signal classifier component 715 may classify the next received signal 745 in second class 755 when the next received signal 745 is a signal needed to maintain a RRC connection state.

As further shown in FIG. 8, when the particular signal is classified as first class, process 800 may include increasing the value of the dormancy timer (block 870). When the particular signal is classified as second class, process 800 may include decreasing the value of the dormancy timer (block 880). For example, in implementations described above in connection with FIG. 7, timer adjustment component 720 of device 600 may receive either first class 750 indication or second class 755 indication from signal classifier component 715. If first class 750 indication is received, timer adjustment component 720 may increase default value 735 of the dormancy timer to a value larger than default value 735 (e.g., provided by indication 730 of the initialized dormancy timer values), as indicated by reference number 760. If second class 755 indication is received, timer adjustment component 720 may decrease default value 735 of the dormancy timer to a value smaller than default value 735 (e.g., provided by indication 730 of the initialized dormancy timer values), as indicated by reference number 765.

Process block 810 may include the process blocks depicted in FIG. 9. As shown in FIG. 9, process block 810 may include classifying the access/control channel signals into the first class when the signals are needed for setup or release of new RRC connections (block 900) or classifying the access/control channel signals into the second class when the signals are needed to maintain RRC connection states (block 910). For example, in implementations described above in connection with FIG. 7, initialization component 705 of device 600 may classify, into a first class, access/control channel signals that are needed for setup or release of new RRC connections, and may classify, into a second class, access/control channel signals that are needed to maintain RRC connection states.

Process block 820 may include the process blocks depicted in FIG. 10. As shown in FIG. 10, process block 820 may include initializing the dormancy timer to a default value (block 1000), initializing the dormancy timer to a value smaller than the default value (block 1010), or initializing the dormancy timer to a value larger than the default value (block 1020). For example, in implementations described above in connection with FIG. 7, initialization component 705 of device 600 may initialize the dormancy timer to a default value (e.g., a value pre-configured for user device 110 or base station 130), a value larger than the default value, or a value smaller than the default value. The value larger than the default value may reduce a number of setups or releases of RRC connections. Whereas, the value smaller than the default value may reduce a number of RRC connections.

Systems and/or methods described herein may adaptively and dynamically optimize a setting of a dormancy timer to improve a capacity of a LTE system. The dormancy timer may be provided in a user device and/or a base station, and may be used to time a dormant (or inactive) state of the user device.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-10, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, certain portions of the invention may be implemented as a "component" or "logic" that performs one or more functions. These components or logic may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method implemented by a device, the method comprising:
    classifying, by the device, access or control channel signals into a first class or a second class;
    initializing, by the device, a dormancy timer associated with the device;
    setting, by the device, a signal target utilization threshold;
    receiving, by the device, actual signals via the access or control channel;
    identifying, by the device and when a number of the actual signals exceeds the signal target utilization threshold, a particular signal, from the actual signals, as belonging to the first class or the second class;
    increasing, by the device, a default value of the dormancy timer when the particular signal belongs to the first class; and
    decreasing, by the device, the default value of the dormancy timer when the particular signal belongs to the second class.

2. The method of claim 1, further comprising:
    setting the dormancy timer to the default value after initializing the dormancy timer.

3. The method of claim 1, where classifying access or control channel signals includes:
    classifying the access or control channel signals into the first class when the access or control channel signals are used for setup or release of new Radio Resource Control (RRC) connections, and
    classifying the access or control channel signals into the second class when the access or control channel signals are used to maintain RRC connection states.

4. The method of claim 1, where initializing a dormancy timer includes one of:
    initializing the dormancy timer to the default value,
    initializing the dormancy timer to a value smaller than the default value, or
    initializing the dormancy timer to a value larger than the default value.

5. The method of claim 1, where the device comprises a base station provided in a Long Term Evolution (LTE)-based network.

6. The method of claim 1, where the access or control channel signals include one or more of:
    a Radio Resource Control (RRC) connection request message,
    a RRC connection setup message,
    a RRC connection setup complete message, or
    a transfer request.

7. The method of claim 1, where:
    increasing the default value of the dormancy timer reduces a number of setups or releases of Radio Resource Control (RRC) connections, and
    decreasing the default value of the dormancy timer reduces a number of RRC connections.

8. The method of claim 1, where the signal target utilization threshold includes a configurable threshold for a number of the actual signals.

9. A device, comprising:
    a memory to store a plurality of instructions; and
    a processor to execute instructions in the memory to:
        classify access or control channel signals into a first class or a second class,
        initialize a dormancy timer associated with the device,
        set the dormancy timer to a default value,
        set a signal target utilization threshold,
        receive actual signals via the access or control channel,
        identify, when a number of the actual signals exceeds the signal target utilization threshold, a particular signal, from the actual signals, as belonging to the first class or the second class,
        increase the default value of the dormancy timer when the particular signal belongs to the first class, and
        decrease the default value of the dormancy timer when the particular signal belongs to the second class.

10. The device of claim 9, where, when classifying access or control channel signals, the processor is further to execute instructions in the memory to:
  classify the access or control channel signals into the first class when the access or control channel signals are used for setup or release of new Radio Resource Control (RRC) connections, and
  classify the access or control channel signals into the second class when the access or control channel signals are used to maintain RRC connection states.

11. The device of claim 9, where, when initializing a dormancy timer, the processor is further to execute instructions in the memory to one of:
  initialize the dormancy timer to a value smaller than the default value, or
  initialize the dormancy timer to a value larger than the default value.

12. The device of claim 9, where the device comprises a user device or a base station provided in a Long Term Evolution (LTE)-based network.

13. The device of claim 9, where the access or control channel signals include one or more of:
  a Radio Resource Control (RRC) connection request message,
  a RRC connection setup message,
  a RRC connection setup complete message, or
  a transfer request.

14. The device of claim 9, where:
  increasing the default value of the dormancy timer reduces a number of setups or releases of Radio Resource Control (RRC) connections, and
  decreasing the default value of the dormancy timer reduces a number of RRC connections.

15. One or more non-transitory computer-readable media storing instructions executable by one or more processors provided in a device of a Long Term Evolution (LTE)-based network, the media storing one or more instructions for:
  classifying access or control channel signals into a first class or a second class;
  initializing a dormancy timer associated with the device;
  setting the dormancy timer to a default value;
  setting a signal target utilization threshold;
  receiving actual signals via the access or control channel;
  identifying, when a number of the actual signals exceeds the signal target utilization threshold, a particular signal, from the actual signals, as belonging to the first class or the second class;
  increasing the default value of the dormancy timer when the particular signal belongs to the first class; and
  decreasing the default value of the dormancy timer when the particular signal belongs to the second class.

16. The media of claim 15, where the one or more instructions for classifying access or control channel signals further include one or more instructions for:
  classifying the access or control channel signals into the first class when the access or control channel signals are used for setup or release of new Radio Resource Control (RRC) connections, and
  classifying the access or control channel signals into the second class when the access or control channel signals are used to maintain RRC connection states.

17. The media of claim 15, where the one or more instructions for initializing a dormancy timer further include one or more instructions for one of:
  initializing the dormancy timer to a value smaller than the default value, or
  initializing the dormancy timer to a value larger than the default value.

18. The media of claim 15, where the device comprises a user device or a base station.

19. The media of claim 15, where the access or control channel signals include one or more of:
  a Radio Resource Control (RRC) connection request message,
  a RRC connection setup message,
  a RRC connection setup complete message, or
  a transfer request.

20. The media of claim 15, where:
  increasing the default value of the dormancy timer reduces a number of setups or releases of Radio Resource Control (RRC) connections, and
  decreasing the default value of the dormancy timer reduces a number of RRC connections.

\* \* \* \* \*